US012358025B2

(12) United States Patent
Zsoldos et al.

(10) Patent No.: US 12,358,025 B2
(45) Date of Patent: Jul. 15, 2025

(54) GRAIN SORTING PROCESS

(71) Applicant: MINCH MALT LIMITED, Athy (IE)

(72) Inventors: Peter Zsoldos, Colchester (GB); Ivan Calusic, Resetari (HR)

(73) Assignee: MINCH MALT LIMITED, The Maltings Athy (IE)

( * ) Notice: Subject to any disclaimer, the term of this patent is extended or adjusted under 35 U.S.C. 154(b) by 0 days.

(21) Appl. No.: 18/742,674

(22) Filed: Jun. 13, 2024

(65) Prior Publication Data

US 2024/0367199 A1 Nov. 7, 2024

Related U.S. Application Data

(62) Division of application No. 18/001,095, filed as application No. PCT/EP2021/065359 on Jun. 8, 2021.

(30) Foreign Application Priority Data

Jun. 8, 2020 (GB) ..................................... 2008617

(51) Int. Cl.
*B07C 5/342* (2006.01)

(52) U.S. Cl.
CPC .... *B07C 5/3425* (2013.01); *B07C 2501/0081* (2013.01)

(58) Field of Classification Search
CPC .......... B07C 5/3425; B07C 2501/0081; B65G 47/53; B65G 47/74; B65G 69/0441
USPC .......................................................... 209/580
See application file for complete search history.

(56) References Cited

U.S. PATENT DOCUMENTS

| | | | | |
|---|---|---|---|---|
| 4,057,146 | A | 11/1977 | Castaneda et al. | |
| 5,308,981 | A | 5/1994 | Perten | |
| 5,779,058 | A | 7/1998 | Satake et al. | |
| 7,016,043 | B2 | 3/2006 | Fukumori et al. | |
| 8,569,644 | B2 * | 10/2013 | Nierle .................. | G01N 21/359 250/341.7 |
| 8,626,337 | B2 | 1/2014 | Corak et al. | |
| 2011/0089090 | A1 | 4/2011 | Nierle et al. | |

(Continued)

FOREIGN PATENT DOCUMENTS

| | | | |
|---|---|---|---|
| EP | 3604178 | A1 | 2/2020 |
| WO | 2009006302 | A1 | 1/2009 |
| WO | 2013175870 | A1 | 1/2016 |

*Primary Examiner* — Michael McCullough
*Assistant Examiner* — Jessica L Burkman
(74) *Attorney, Agent, or Firm* — LEASON ELLIS LLP

(57) ABSTRACT

Grain sorting process and apparatus include a grain infeed chute for delivery of bulk cereal grain into the apparatus past an in-line measurement station which analyses selected parameters of the grain discharged onto a horizontal grain sorting conveyor and into storage silos in response to the measured parameters. The measurement station has a sensor unit which includes a near-infrared light source for emitting light onto the grain delivered through the grain infeed chute or the grain sorting conveyor. Light reflected from the grain is detected by the sensor to provide a spectrum of the grain. A spectrometer converts the spectrum into corresponding preselected grain parameter values, which are delivered to a controller, which controls operation of the sorting conveyor in response to the measured grain parameter values to deliver the cereal grain into a storage silo having a grain parameter corresponding to the measured grain parameter.

9 Claims, 6 Drawing Sheets

(56) References Cited

U.S. PATENT DOCUMENTS

| | | | |
|---|---|---|---|
| 2013/0168301 A1 | 7/2013 | Dell'endice et al. | |
| 2017/0275100 A1 | 9/2017 | Olson et al. | |
| 2019/0291980 A1* | 9/2019 | Honeck | B65G 69/0441 |
| 2020/0031581 A1 | 1/2020 | Sato et al. | |
| 2020/0270064 A1 | 8/2020 | Batcheller et al. | |
| 2020/0391952 A1 | 12/2020 | Kringstad | |

* cited by examiner

GRAIN SORTING PROCESS

CROSS-REFERENCE TO RELATED APPLICATION

This application is a divisional of, and claims priority from, U.S. patent application Ser. No. 18/001,095, titled GRAIN SORTING PROCESS, filed on Dec. 8, 2022, which is a 371 of International Application PCT/EP2021/065359 filed Jun. 8, 2021, which in turn claims priority of GB 2008617.9 filed Jun. 8, 2020, each of which is hereby incorporated by reference in its entirety.

INTRODUCTION

This invention relates to a grain sorting process. In particular, the present invention relates to an apparatus and a process for in-line sorting of cereal grains, at industrial capacity (100 t/h), ensuring individual storage based on a selected parameter of the cereal grain considered for sorting.

BACKGROUND OF THE INVENTION

Cereal acceptance criteria for use in different industries require the measurement of a number of parameters of the cereal grains. This allows the identification of the most suitable cereal grain batches as well as the storage and subsequent use of homogenous cereal grain batches.

Some current solutions offered to industries to measure quality parameters for the cereals are based mainly on individual sampling of each bulk load of cereal grains received, followed by its measurement with laboratory equipment. Certain companies have developed methods and devices able to measure higher amounts of cereals, but a limiting factor remains the capacity that is able to be processed with such equipment. Solutions have been offered by different companies for in-line measurement of different cereal parameters which either have a limited capacity of the system, and as such are not suitable for production scale, or the values measured are only collected for information purposes, without any action for separation into different cereal grain batches based on the quality of the cereal grain.

U.S. Publication No. US 2013/168301 A1 discloses an apparatus and method for sorting of particles such as seeds, grains and the like. U.S. Pat. No. 4,057,146 A discloses an optical sorting apparatus for beans or grains which provides sorting on the basis of size and color. U.S. Pat. No. 5,779,058 A discloses a color sorting apparatus for grains.

A grain sorting process and apparatus is described in U.S. Pat. No. 8,569,644 for analyzing grain in-line and separating grain into batches on the basis on one or more sensed parameter values, such as protein content or moisture content for example. The separation process separates the grain into homogenous batches which is desirable for subsequent processing of the grain. It is an object of the present invention to provide an improved process and apparatus of this type.

SUMMARY OF THE INVENTION

According to the invention, there is provided a process for analyzing bulk quantities of grain in-line and separating the grain into batches, each batch corresponding to at least one pre-selected grain parameter value, the processing including:

delivering the grain continuously past an in-line measurement station, analyzing the grain by emitting light onto the grain passing the in-line measurement station and detecting the light reflected from the grain to provide a spectrum of the grain, converting the spectrum into one or more corresponding preselected grain parameters, and separating the grain in-line into batches in response to one or more corresponding preselected grain parameter values, wherein the process includes controlling grain flow through the measurement station for forming an optically dense grain layer at the measurement station for reflecting the light emitted onto the grain.

In one embodiment of the invention, the process includes funneling the grain for delivering the grain in an optically dense grain layer stream past a sensing head at the measuring station.

In another embodiment the process includes delivering the grain through an infeed chute having a sensor unit mounted in a side wall of the infeed chute at the measurement station, passing grain delivered through the infeed chute to a funnel mounted on the side wall at the sensor unit, forming the optically dense grain layer by means of the funnel and delivering the grain in an optically dense grain layer stream against the side wall past a sensing head of the sensor unit mounted on the side wall.

In another embodiment, the process includes funneling the grain for delivering the grain in an optically dense grain layer stream past a sensor unit at the measuring station, delivering the grain through an infeed chute having the sensor unit mounted at a side wall of the infeed chute at the measurement station, passing grain delivered through the infeed chute through a funnel mounted on the side wall at the sensor unit, forming the optically dense grain layer by means of the funnel and delivering the grain in an optically dense grain layer stream against the side wall past a sensing head of the sensor unit mounted on the side wall, channeling the grain between tapered funnel side walls projecting outwardly from the side wall of the grain infeed chute at which the sensor unit is mounted and between an angled guide flap and the chute side wall, the angled guide flap extending between the funnel side walls and spaced-apart from the chute side wall at which the sensor unit is mounted, said angled guide flap tapering inwardly from an inlet of the funnel towards the chute side wall on which the sensor unit is mounted.

In another embodiment, the process includes conveying the grain through the measuring station on a grain feed conveyor having a number of spaced-apart paddles mounted within and movable through an associated trough by moving the paddles through the associated trough of the conveyor and forming the optically dense grain layer in the trough between each adjacent pair of paddles.

In another embodiment, the process includes conveying the grain through the measuring station on a grain feed conveyor enclosed within a housing and having a number of spaced-apart paddles mounted within and movable through an associated trough by moving the paddles through the associated trough of the conveyor and forming the optically dense grain layer in the trough between each adjacent pair of paddles, the measuring station being mounted on a side wall of the housing and having a sensor unit mounted at the side wall of the housing at a side of the grain feed conveyor for sensing the optically dense grain layer formed between each adjacent pair of paddles.

In another embodiment the process includes forming an optically dense grain layer having a thickness of at least 5 cm.

In another embodiment the process includes emitting near-infrared light onto the optically dense grain layer for generating a near-infrared spectrum of the grain.

In another aspect the invention provides apparatus for analyzing bulk quantities of grain in-line and separating the grain into two or more batches in response to at least one sensed grain parameter value, the apparatus comprising:

- a measurement station having a sensor unit;
- means for delivering grain past the sensor unit in an optically dense grain layer;
- a light emitter at the measurement station operable to emit light onto the optically dense grain layer for reflection back to the sensor unit;
- the sensor unit for detecting light reflected from the grain to provide a spectrum;
- a spectrometer for converting the spectrum into at least one grain parameter value; and
- means for separating the grain into two or more batches in response to the measured at least one grain parameter value.

In another embodiment the means for delivering the grain past the sensor unit in an optically dense grain layer comprises a funnel having tapered sidewalls leading to a narrowed neck portion, a sensing head of the sensor unit being mounted at a side of the neck portion for streaming the grain in an optically dense grain layer in front of the sensing head.

In another embodiment, the measurement station is mounted on a grain infeed chute, the measuring station having a sensor unit mounted at a side wall of the grain infeed chute, a funnel mounted within the grain infeed chute, the funnel comprising tapered funnel side walls projecting outwardly from the side wall of the grain infeed chute at which the sensor unit is mounted, an angled guide flap extending between the funnel side walls and spaced-apart from the chute side wall at which the sensor unit is mounted, said angled guide flap tapering inwardly from an inlet of the funnel towards the chute side wall on which the sensor unit is mounted.

In another embodiment, the angled guide flap is curved between an inlet end and an outlet end of the angled guide flap.

In another embodiment, the outlet ends of the tapered funnel side walls connect to a funnel neck portion having parallel neck walls extending outwardly from each funnel side wall.

In another embodiment, an outlet end of the angled guide flap extends partially into the funnel neck portion between the neck walls.

In a further embodiment the means for delivering the grain in an optically dense grain layer comprises a grain feed conveyor having a number of spaced-apart paddles which are movable along an associated trough to form an optically dense grain layer in the trough between adjacent pairs of paddles, the sensor unit being mounted at a side of the trough.

In another embodiment, the means for delivering the grain in an optically dense grain layer comprises a grain feed conveyor having a number of spaced-apart paddles which are movable along an associated trough in a position extending vertically upwardly form a bottom wall of the trough to form an optically dense grain layer in the trough between adjacent pairs of paddles, the grain feed conveyor being mounted within a housing having a grain inlet end connected to a grain infeed chute and a grain outlet end having at least one discharge chute, the grain feed conveyor communicating between the grain inlet end and the grain outlet end of the housing, the measuring station being mounted at a side wall of the housing and having a sensor unit mounted at the side wall of the housing at a side of the grain feed conveyor for sensing an optically dense grain layer formed between each adjacent pair of paddles on the grain feed conveyor.

BRIEF DESCRIPTION OF THE DRAWINGS

The invention will be more clearly understood by the following description of some embodiments thereof, given by way of example only, with reference to the accompanying drawings, in which.

DETAILED DESCRIPTION OF THE PREFERRED EMBODIMENTS

Figure 1:
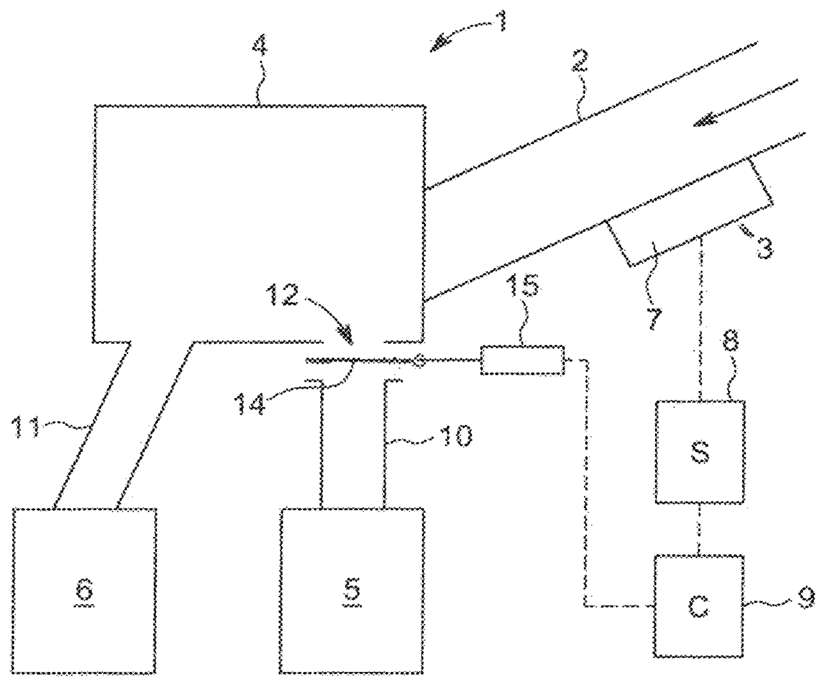
FIG. 1 is a schematic illustration of grain sorting apparatus for carrying out the process of the invention.

Referring to the drawings, and initially to FIGS. 1 to 4 thereof, there is illustrated grain sorting apparatus according to the invention, indicated generally by the reference numeral 1. The apparatus 1 includes a grain infeed chute 2 for delivery of bulk cereal grain into the apparatus 1. An in-line measurement station 3 analyzes selected parameters of grain delivered through the infeed chute 2 into the apparatus 1. The grain infeed chute 2 discharges onto a horizontal grain sorting conveyor 4 which discharges the grain into storage silos 5, 6 in response to one or more measured parameters of the grain determined at the measurement station 3.

The measurement station 3 has a sensor unit 7 which includes a near-infrared (NIR) light source for emitting light onto grain delivered through the grain infeed chute 2. The light is reflected from the grain and reflected light is detected by the sensor 7 to provide a spectrum of the grain. A spectrometer 8 connected to the sensor unit 7 converts the spectrum into one or more corresponding preselected grain parameter values. The grain parameter values generated by the spectrometer 8 are delivered to a controller 9. The controller 9 then controls operation of the sorting conveyor 4 in response to the measured grain parameter values to deliver the cereal grain into a storage silo 5, 6 having a grain parameter corresponding to the measured grain parameter.

Figure 2:
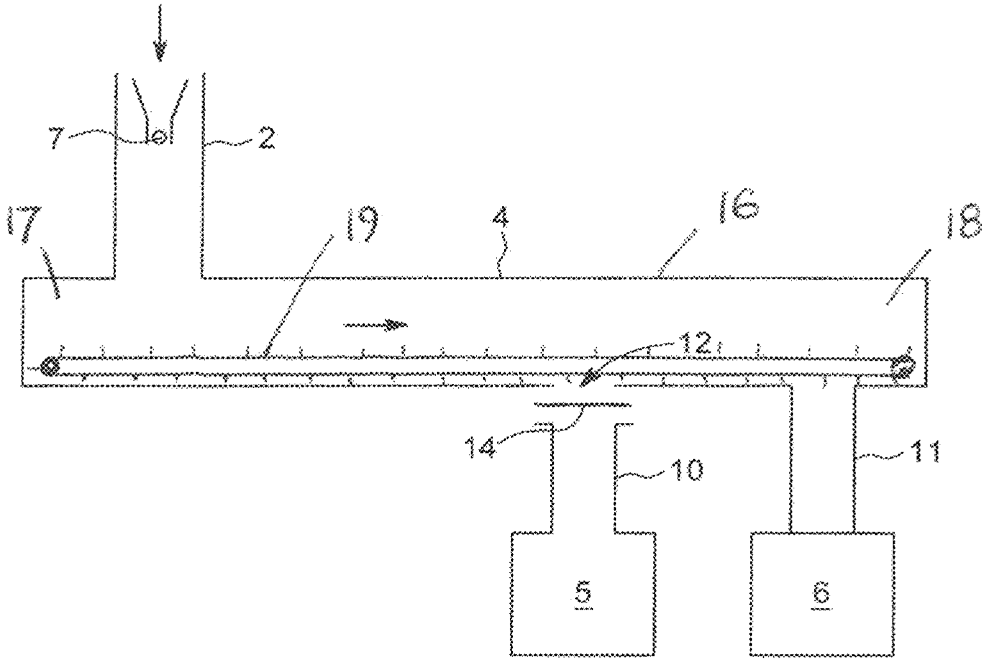
FIG. 2 is another schematic illustration of the grain sorting apparatus.

Two storage silos 5, 6 are shown in FIG. 1 and FIG. 2 by way of illustration, although it will be appreciated that any desired number of storage silos may be provided. Discharge chutes 10, 11 communicate between the sorting conveyor 4 and each silo 5, 6. An inlet 12 of the first discharge chute 10 has a slide plate 14 moveable by means of a pneumatic ram 15 between a closed position across the inlet 12, closing the inlet 12, and an open position to allow discharge of cereal grain from the sorting conveyor 4 through the discharge chute 10 and into the silo 5.

The second discharge chute 11, which is downstream of the first discharge chute 10, may be fitted with a similar slide plate or may be open as shown in FIG. 2. Thus, when the slide plate 14 at the inlet 12 of the first discharge chute 10 is open, cereal grain is delivered to the first silo 5 and when the slide plate 14 is closed the cereal grain is delivered into the second silo 6. The controller 9 regulates operation of the slide plate 14 in response to sensed grain parameters to deliver the cereal grain into the required silo 5, 6 for collecting homogenous cereal grain in each silo 5, 6.

The sorting conveyor 4 has a box-section housing 16 with an inlet end 17 and an outlet end 18. A grain feed conveyor 19 is mounted within the housing 16 for delivery of grain through the housing 16 between the inlet end 17 and outlet end 18 of the housing 16. Grain is discharged from the infeed chute 2 onto the grain feed conveyor 19 at the inlet end 17 of the housing 16 and is transported by the grain feed conveyor 19 to the outlet end 18 of the housing 16 for discharge through one of the discharge chutes 10, 11.

Figure 3:
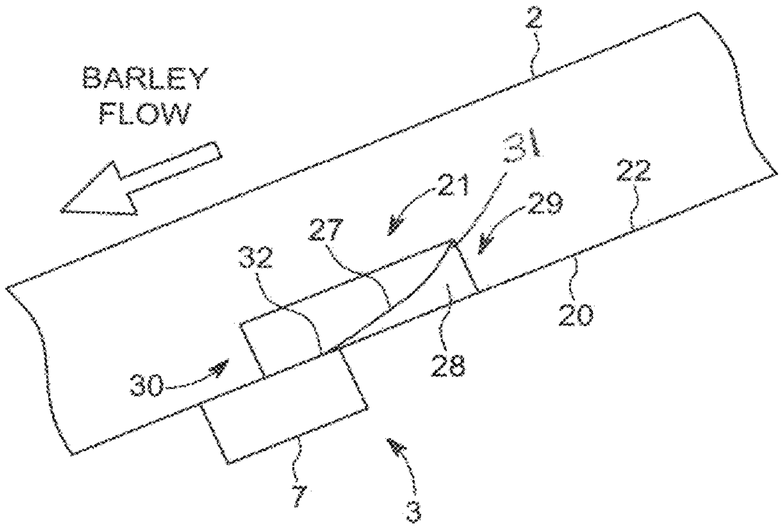
FIG. 3 is a schematic illustration of a measurement station forming portion of the apparatus.
Figure 4:
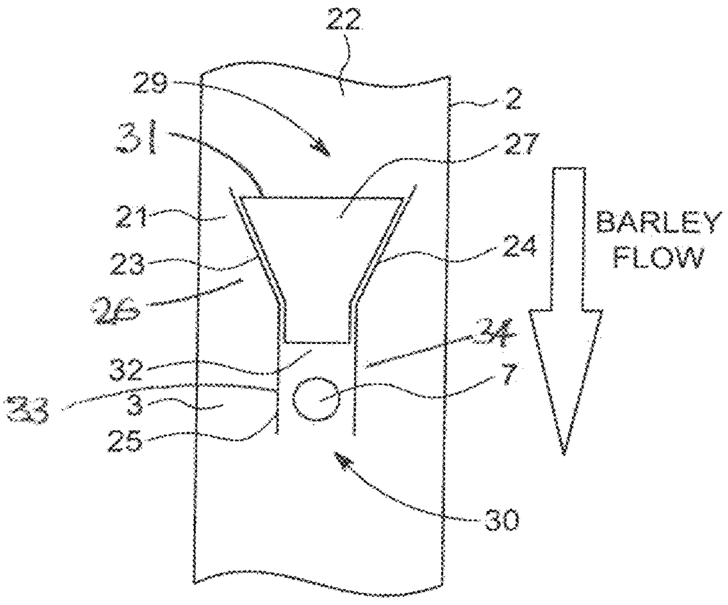
FIG. 4 is another schematic illustration of the measurement station.
Figure 5:
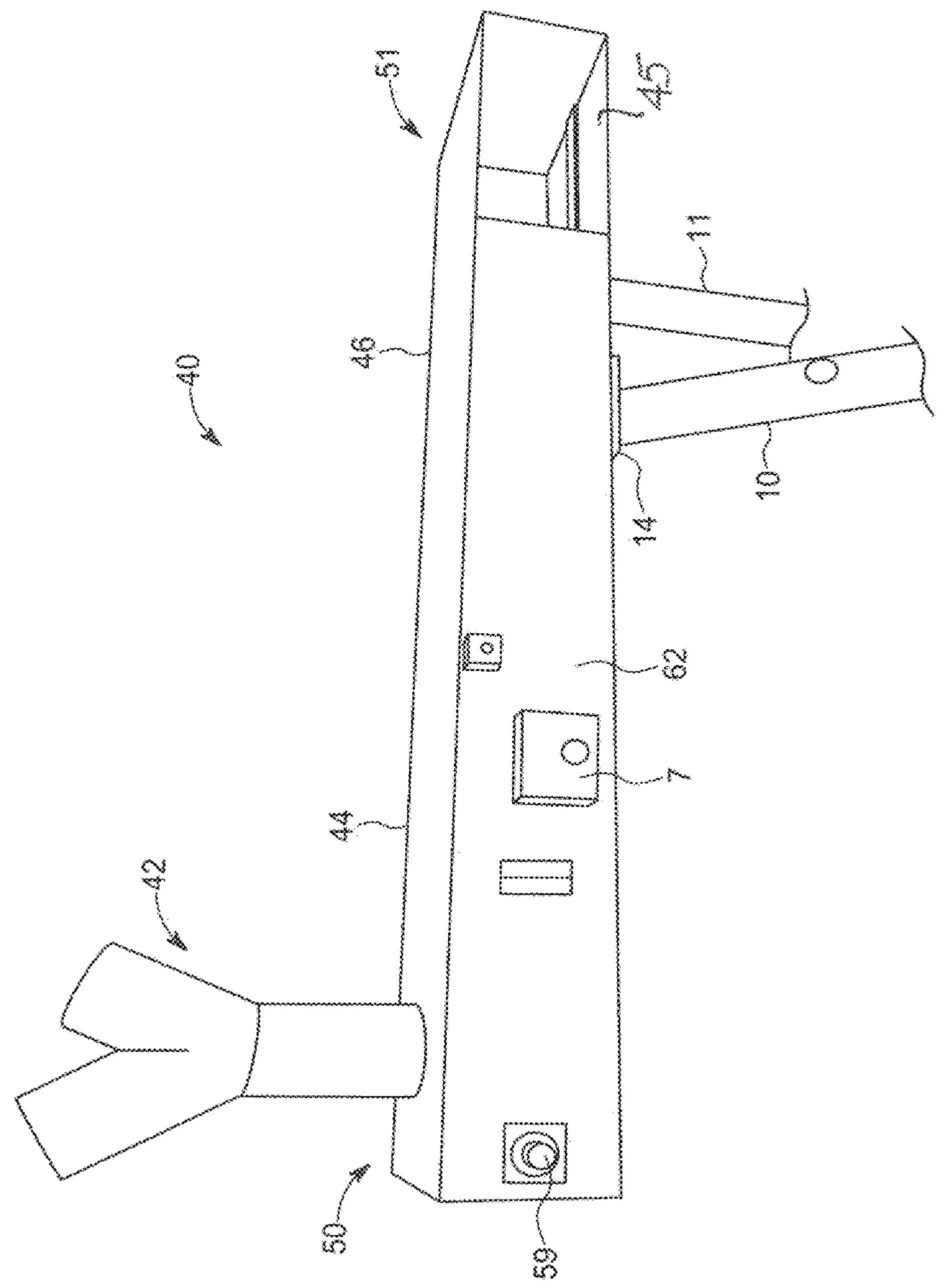
FIG. 5 is a perspective view showing apparatus for carrying out another grain sorting process of the invention.
Figure 6:
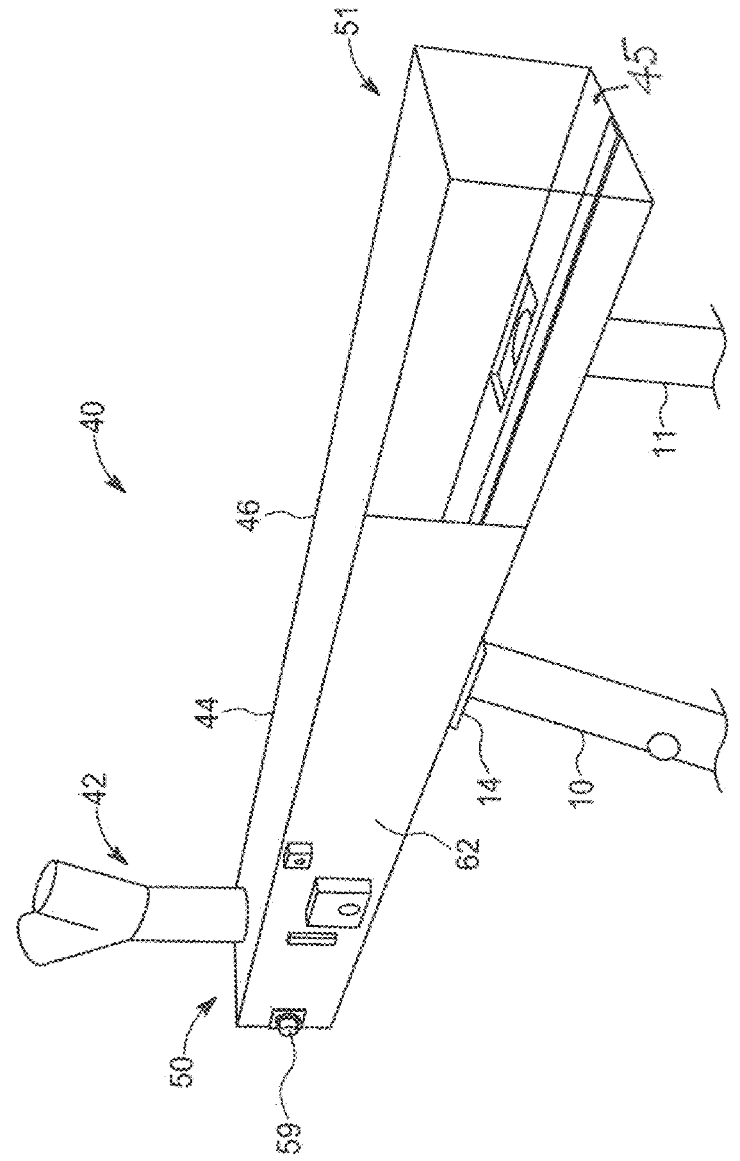
FIG. 6 is a further perspective view of the apparatus shown in FIG. 5.
Figure 7:
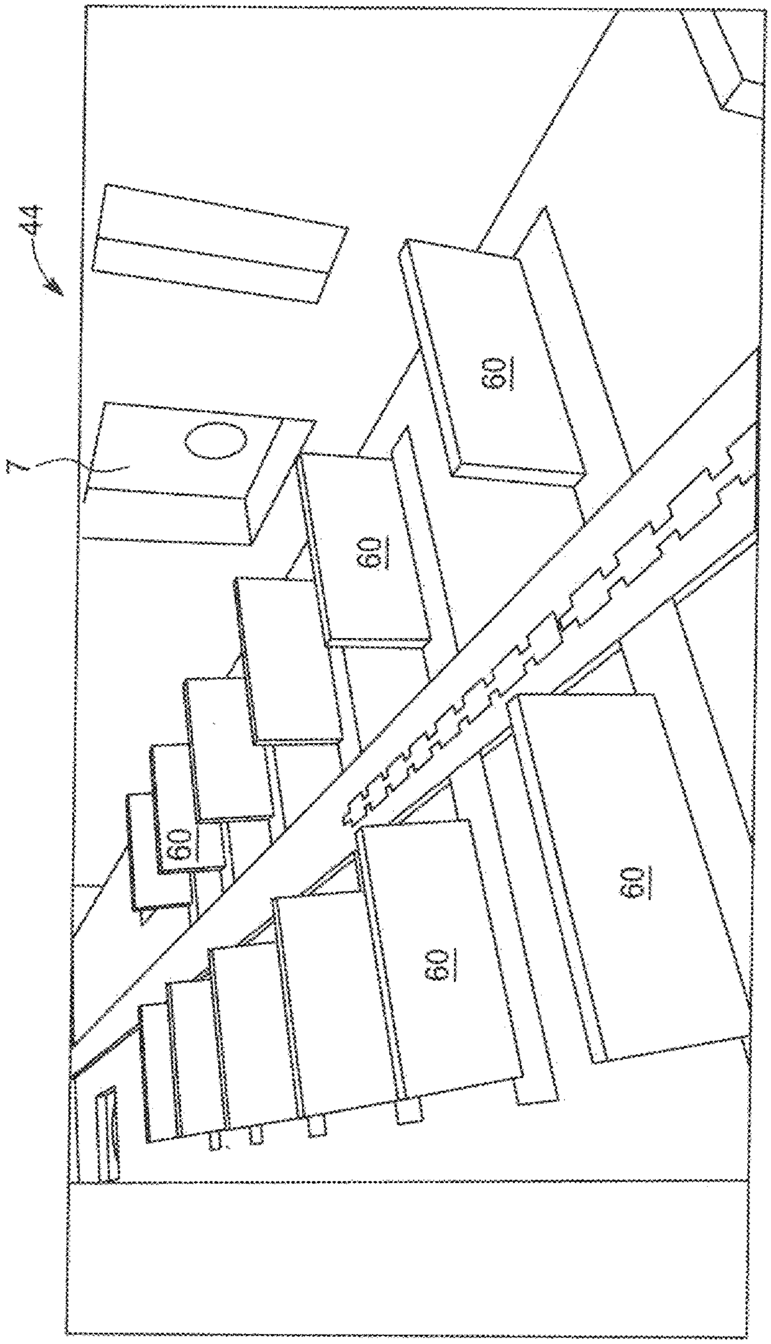
FIG. 7 is a detail diagrammatic illustration of portion of the apparatus shown in FIG. 5.
Figure 8:
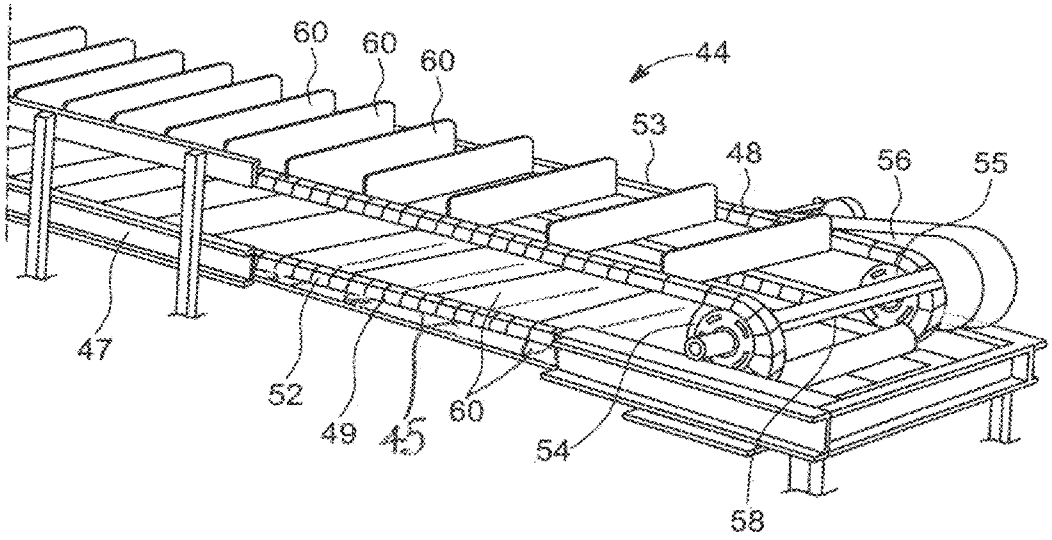
FIG. 8 is a detail perspective view of portion of the apparatus shown in FIG. 5.

Referring in particular to FIG. 3 and FIG. 4, the in-line measurement station 3 is shown in more detail. In this case the sensor unit 7 is mounted on a bottom side wall 20 of the grain infeed chute 2. A funnel 21 is mounted within the infeed chute 2 in alignment with the sensor unit 7 to deliver a portion of the grain passing through the infeed chute 2 in an optically dense grain layer stream past the sensor unit 7. The optically dense grain layer stream is about 5 cm deep against an inside face 22 of the bottom side wall 20 of the infeed chute 2.

The funnel 21 has an upper tapered portion 26 with inwardly tapered side walls 23, 24 leading to a lower narrowed neck portion 25 within which a sensing head of the sensor unit 7 is mounted. The funnel side walls 23, 24 and neck portion 25 project outwardly from the inside face 22 of the bottom side wall 20 of the chute 2. The neck portion 25 is formed by two spaced-apart substantially parallel neck walls 33, 34 extending outwardly and downwardly from each funnel side wall 23, 24 and forming extensions thereof.

In addition, an angled guide flap 27 narrows a grain passage 28 through the funnel 21 between an inlet 29 and an outlet 30 of the funnel 21. This provides a consistent depth of grain at the sensor unit 7 throughout delivery of cereal grain through the grain infeed chute 2 to promote sensor accuracy. The angled guide flap 27 extends between the funnel side wall 23, 24 and is spaced-apart from the bottom side wall 20 of the infeed chute 2. The angled guide flap 27 tapers inwardly from the inlet 29 of the funnel 21 towards the bottom side wall 20 of the infeed chute 2. An outlet end 32 of the flap 27 is spaced apart from the inside face 22 of the bottom side wall 20 of the grain infeed chute 2 by a required distance to produce a desired grain layer stream depth at the sensor unit 7, which in this case is about 5 cm. The angled guide flap 27 may be straight or curved between an inlet end 31 and the outlet end 32 of the angled guide flap 27.

In use, grain is delivered through the infeed chute 2 past the in-line measurement station 3. The sensor unit 7 emits NIR light onto the grain delivered through the grain infeed chute 2. The light is reflected from the grain and reflected light is detected by the sensor 7 to provide a spectrum of the grain. The spectrometer 8 connected to the sensor unit 7 converts the spectrum into one or more corresponding preselected grain parameter values. The grain parameter values generated by the spectrometer 8 are delivered to the controller 9. The controller 9 then controls operation of the sorting conveyor 4 in response to the measured grain parameter values to deliver the cereal grain into a storage silo 5, 6 having a grain parameter corresponding to the measured grain parameter.

Referring now to FIGS. 5 to 8, there is shown another grain sorting apparatus according to a second embodiment of the invention, indicated generally by the reference numeral 40. Parts similar to those described previously are assigned the same reference numerals. The apparatus 40 has a grain infeed chute 42 discharging to an inlet end 50 of a grain sorting conveyor 44. The grain sorting conveyor 44 has a box-section housing 46 at a bottom of which is mounted an elongate trough 47. A grain feed conveyor 48 is mounted within the housing 46 such that a lower pass 49 of the grain feed conveyor 48 is located in and travels along the trough 47 between the inlet end 50 and an outlet end 51 of the housing 46 for delivery of grain received from the infeed chute 42 at the inlet end 50 to the discharge chutes 10, 11 at the outlet end 51 of the housing 46.

The grain feed conveyor 48 has two spaced-apart parallel endless drive chains 52, 53 mounted on drive sprockets 54, 55 at the outlet end 51 of the housing 46. A drive mechanism 56 rotates the drive sprockets 54, 55 which are mounted on a drive shaft 58 drivably connected to the drive mechanism 56. Opposite ends of each drive chain 52, 53 are carried on associated rotatable sprockets (not shown) mounted on a rotatable shaft 59 at the inlet end 50 of the housing 46.

A plurality of spaced-apart scraper paddles 60 are mounted between the drive chains 52, 53. Each scraper paddle 60 extends substantially perpendicular to the direction of travel of the drive chains 52, 53. Grain delivered from the grain infeed chute 42 into the housing 46 collects in the trough 47 between scraper paddles 60 on the lower pass 49 of the grain feed conveyor 48 which project vertically upwardly from a bottom wall 45 of the trough 47 and is delivered along the trough 47 between the inlet end 50 and the outlet end 51 of the housing 46 by movement of the scraper paddles 60 along the trough 47.

In this case the sensor unit 7 is positioned on a side wall 62 of the housing 46. The depth of the scraper paddles 60 is such that the sensing head of the sensor unit 7 is fully covered by the depth of grain retained in the trough 47 between each adjacent pair of scraper paddles 60.

The process and apparatus of the invention is able to measure any desired grain parameter, such as protein content, moisture content, etc., of the cereal grain during intake of bulk cereal grain material. The intake of cereal grain is separated into quality groups based on the different measured levels of the parameter or parameters under consideration and each quality group is separated out in-line and stored in its own silo 5, 6 by the process and apparatus of the invention. Thus, the cereal grain is separated in-line into homogenous batches of cereal grain which ensures consistently high quality when the cereal grain is later processed.

It will be appreciated that the invention provides a process and apparatus for high-speed, non-destructive measurement in real time and providing a high level of measurement accuracy.

The sensor head of the sensor unit 3 is in direct contact with the cereal grain product and measures the required parameters using NIR technology. To ensure that the NIR sensor produces correct measured values, the measurements are taken in the compact product flow in which the cereal grains are closely packed together. The compact product flow is permanently illuminated with NIR light. The absorption behavior and hence the spectrum of the reflected light changes depending on the concentration of the parameters in the passing cereal grain. Through comparison of the reflected light with a calibration database created with the help of a laboratory, the respective properties such as the protein content can be determined.

The terms "comprise" and "include", and any variations thereof required for grammatical reasons, are to be considered as interchangeable and accorded the widest possible interpretation.

The invention is not limited to the embodiments hereinbefore described which may be varied in both construction and detail within the scope of the appended claims.

The invention claimed is:

1. A process for analyzing bulk quantities of grain in-line and separating the grain into batches, each batch corresponding to at least one pre-selected grain parameter value, the processing including:

delivering the grain continuously past an in-line measurement station, analyzing the grain by emitting light onto the grain passing the in-line measurement station and detecting the light reflected from the grain to provide a spectrum of the grain, converting the spectrum into one or more corresponding preselected grain parameter values, and separating the grain in-line into batches in response to the one or more corresponding preselected grain parameter values, and controlling grain flow through the measurement station for forming an optically dense grain layer at the measurement station for reflecting the light emitted onto the grain, wherein the process includes:

funneling the grain for delivering the grain in an optically dense grain layer stream past a sensor unit at the measurement station, delivering the grain through an infeed chute having the sensor unit mounted at a side wall of the infeed chute at the measurement station, passing grain delivered through the infeed chute through a funnel mounted on the side wall at the sensor unit, forming the optically dense grain layer by means of the funnel and delivering the grain in an optically dense grain layer stream against the side wall past a sensing head of the sensor unit mounted on the side wall, and channeling the grain between tapered funnel side walls projecting outwardly from the side wall of the grain infeed chute at which the sensor unit is mounted and between an angled guide flap and the chute side wall, the angled guide flap extending between the funnel side walls and spaced-apart from the chute side wall at which the sensor unit is mounted, said angled guide flap tapering inwardly from an inlet of the funnel towards the chute side wall on which the sensor unit is mounted.

2. The process as claimed in claim 1, wherein the process includes forming an optically dense grain layer having a thickness of at least 5 cm.

3. The process as claimed in claim 1, wherein the process includes emitting near-infrared light onto the optically dense grain layer for generating a near-infrared spectrum of the grain.

4. Apparatus for analyzing bulk quantities of grain in-line and separating the grain into two or more batches in response to at least one sensed grain parameter value, the apparatus comprising:

a measurement station having a sensor unit;

a grain infeed chute for delivering grain past the sensor unit in an optically dense grain layer;

a light emitter at the measurement station operable to emit light onto the optically dense grain layer for reflection back to the sensor unit;

the sensor unit for detecting light reflected from the grain to provide a spectrum;

a spectrometer for converting the spectrum into at least one grain parameter value; and means for separating the grain into two or more batches in response to the measured at least one grain parameter value, wherein the measurement station is mounted on the grain infeed chute, the measuring station having the sensor unit mounted at a side wall of the grain infeed chute, a funnel mounted within the grain infeed chute, the funnel comprising tapered funnel side walls projecting outwardly from the side wall of the grain infeed chute at which the sensor unit is mounted, and an angled guide flap extending between the funnel side walls and spaced-apart from the chute side wall at which the sensor unit is mounted, said angled guide flap tapering inwardly from an inlet of the funnel towards the chute side wall on which the sensor unit is mounted.

5. The apparatus as claimed in claim 4, wherein the angled guide flap is curved between an inlet end and an outlet end of the angled guide flap.

6. The apparatus as claimed in claim 5, wherein the outlet ends of the tapered funnel side walls connect to a funnel neck portion having parallel neck walls extending outwardly from each funnel side wall.

7. The apparatus as claimed in claim 6, wherein an outlet end of the angled guide flap extends partially into the funnel neck portion between the neck walls.

8. The apparatus as claimed in claim 4, wherein the outlet ends of the tapered funnel side walls connect to a funnel neck portion having parallel neck walls extending outwardly from each funnel side wall.

9. The apparatus as claimed in claim 8, wherein an outlet end of the angled guide flap extends partially into the funnel neck portion between the neck walls.

* * * * *